(12) United States Patent
     Wang

(10) Patent No.: US 12,643,040 B2
(45) Date of Patent: Jun. 2, 2026

(54) RHYTHM GAME WITH GUIDEPATH

(71) Applicant: Beijing Zitiao Network Technology Co., Ltd., Beijing (CN)

(72) Inventor: Xuejiao Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 162 days.

(21) Appl. No.: 18/514,912

(22) Filed: Nov. 20, 2023

(65) Prior Publication Data

US 2024/0165510 A1      May 23, 2024

(30) Foreign Application Priority Data

Nov. 21, 2022    (CN) .......................... 202211456854.1

(51) Int. Cl.
     A63F 13/2145      (2014.01)
     A63F 13/214      (2014.01)
     (Continued)

(52) U.S. Cl.
     CPC ........ A63F 13/424 (2014.09); A63F 13/2145 (2014.09); A63F 13/46 (2014.09);
     (Continued)

(58) Field of Classification Search
     CPC ........ A63F 13/424; A63F 13/44; A63F 13/46; A63F 13/814; A63F 2300/8047;
     (Continued)

(56) References Cited

U.S. PATENT DOCUMENTS

2010/0216547 A1 *   8/2010   Coppard ............... A63F 13/245
                                                              463/31
2011/0086704 A1     4/2011   Davis et al.
                             (Continued)

FOREIGN PATENT DOCUMENTS

CN          101293140 B      9/2011
CN          103520918 A      1/2014
                  (Continued)

OTHER PUBLICATIONS

"Conduct your own band! The VR rhythm music game Maestro VR will be released this year.," Sina VR News Center, Available Online at vr.sina.cn/news/2022-05-26/detail-imizmscu3467096.d.html?from= wap, May 26, 2022, 5 pages.
(Continued)

*Primary Examiner* — Lawrence S Galka
(74) *Attorney, Agent, or Firm* — Alleman Hall LLP

(57) ABSTRACT

According to embodiments of the present disclosure, an interactive method, apparatus, electronic device, and computer storage medium are provided. The method described herein includes: presenting a judgement curve associated with a target audio on an interaction interface, the shape of the judgement curve being determined based on the waveform of the target audio, and the judgement curve moving with the playback of the target audio; determining a set of interaction positions corresponding to a set of predetermined times based on user interaction; and generating an evaluation for user interaction based on a comparison of a set of interaction positions with the judgement curve. In this way, interactive forms of applications can be enriched and User Experience can be improved.

20 Claims, 6 Drawing Sheets

(51) Int. Cl.

| | | |
|---|---|---|
| *A63F 13/25* | (2014.01) | |
| *A63F 13/424* | (2014.01) | |
| *A63F 13/46* | (2014.01) | |
| *A63F 13/54* | (2014.01) | |
| *A63F 13/60* | (2014.01) | |
| *A63F 13/798* | (2014.01) | |
| *A63F 13/814* | (2014.01) | |
| *A63F 13/92* | (2014.01) | |

(52) U.S. Cl.
CPC .............. *A63F 13/54* (2014.09); *A63F 13/60* (2014.09); *A63F 13/798* (2014.09); *A63F 2300/8082* (2013.01)

(58) Field of Classification Search
CPC ...... A63F 2300/8082; G10H 2220/011; G10H 2220/135; G10H 2210/066; G10H 1/368
See application file for complete search history.

(56) References Cited

U.S. PATENT DOCUMENTS

| | | | |
|---|---|---|---|
| 2014/0041512 A1 | 2/2014 | Mastran et al. | |
| 2017/0021270 A1* | 1/2017 | Wang | ..................... A63F 13/92 |
| 2020/0139226 A1 | 5/2020 | Hrincár et al. | |
| 2020/0139240 A1* | 5/2020 | Hrincár | .................. G06T 13/40 |

FOREIGN PATENT DOCUMENTS

| | | | |
|---|---|---|---|
| CN | 104346147 A | 2/2015 | |
| CN | 106362393 A | 2/2017 | |
| CN | 109690450 A | 4/2019 | |
| CN | 109741722 A | 5/2019 | |
| CN | 112328142 A | 2/2021 | |
| CN | 112764711 A | 5/2021 | |
| WO | 2006017612 A2 | 2/2006 | |
| WO | 2010138721 A2 | 12/2010 | |

OTHER PUBLICATIONS

China National Intellectual Property Administration, Office Action and Search Report Issued in Application No. 202211456854.1, Jul. 19, 2025, 20 pages.

China National Intellectual Property Administration, Office Action and Search Report Issued in Application No. 20221145684.1, Jul. 19, 2025, 20 pages.

China National Intellectual Property Administration, Notice of Allowance Issued in Application No. 202211456854.1, Mar. 18, 2026, 7 pages.

\* cited by examiner

200 —

210

PRESENT A JUDGEMENT CURVE ASSOCIATED WITH A TARGET AUDIO

220

DETERMINE A SET OF INTERACTION POSITIONS CORRESPONDING TO A SET OF PREDETERMINED TIME INSTANTS BASED ON A USER INTERACTION

230

GENERATE AN EVALUATION OF THE USER INTERACTION BASED ON A COMPARISON OF THE SET OF INTERACTION POSITIONS WITH THE JUDGEMENT CURVE

300 —

RHYTHM GAME WITH GUIDEPATH

CROSS-REFERENCE TO RELATED APPLICATIONS

This application claims the benefit of Chinese Patent Application No. 202211456854.1 filed on Nov. 21, 2022, entitled "METHOD AND APPARATUS FOR INTERACTION", which is hereby incorporated by reference in its entirety.

FIELD

Example embodiments of the present disclosure generally relate to the field of computer, and in particular to a method, apparatus, electronic device, and computer-readable storage medium for interaction.

BACKGROUND

With the development of computer technology, various types of interactive applications have emerged. For example, in many fields, such as, game, simulation, virtual reality and so on, it is already possible to provide users with rich virtual scenes through electronic devices, and the users can interact with those virtual scenes. For example, some music interactive applications (e.g., rhythm games) can determine the user's interaction performances based on user interaction, and in turn feedback corresponding scores.

SUMMARY

In a first aspect of the present disclosure, a method for interaction is provided. The method comprises: presenting, in an interaction interface, a judgement curve associated with a target audio, a shape of the judgement curve being determined based on a waveform of the target audio, and the judgement curve moving with a playback of the target audio; determining a set of interaction positions corresponding to a set of predetermined time instants based on a user interaction; and generating an evaluation for the user interaction based on a comparison of the set of interaction positions with the judgement curve.

In a second aspect of the present disclosure, an apparatus for interaction is provided. The apparatus comprises: a presentation module configured for presenting, in an interaction interface, a judgement curve associated with a target audio, a shape of the judgement curve being determined based on a waveform of the target audio, and the judgement curve moving with a playback of the target audio; an interaction position determination module configured for determining a set of interaction positions corresponding to a set of predetermined time instants based on a user interaction; and an evaluation generation module configured for generating an evaluation for the user interaction based on a comparison of the set of interaction positions with the judgement curve.

In the third aspect of the present disclosure, an electronic device is provided. The electronic device comprises at least one processing unit and at least one memory coupled to the at least one processing unit and storing instructions for execution by the at least one processing unit. The instructions, when executed by the at least one processing unit, cause the electronic device to carry out the method of the first aspect.

In the fourth aspect of the present disclosure, a computer-readable storage medium is provided. The computer-readable storage medium stores a computer program that, when executed by a processor, carries out the method of the first aspect.

It should be understood that the content described in the summary section is not intended to limit the key features or important features of the embodiments of the present disclosure, nor is it intended to limit the scope of the present disclosure. Other features of the present disclosure will be easily understood by the following description.

BRIEF DESCRIPTION OF THE DRAWINGS

The above and other features, advantages, and aspects of various embodiments of the present disclosure will become apparent in connection with the accompanying drawings and with reference to the following detailed description. In the drawings, the same or similar reference numerals indicate the same or similar elements, where.

DETAILED DESCRIPTION

Figure 1:
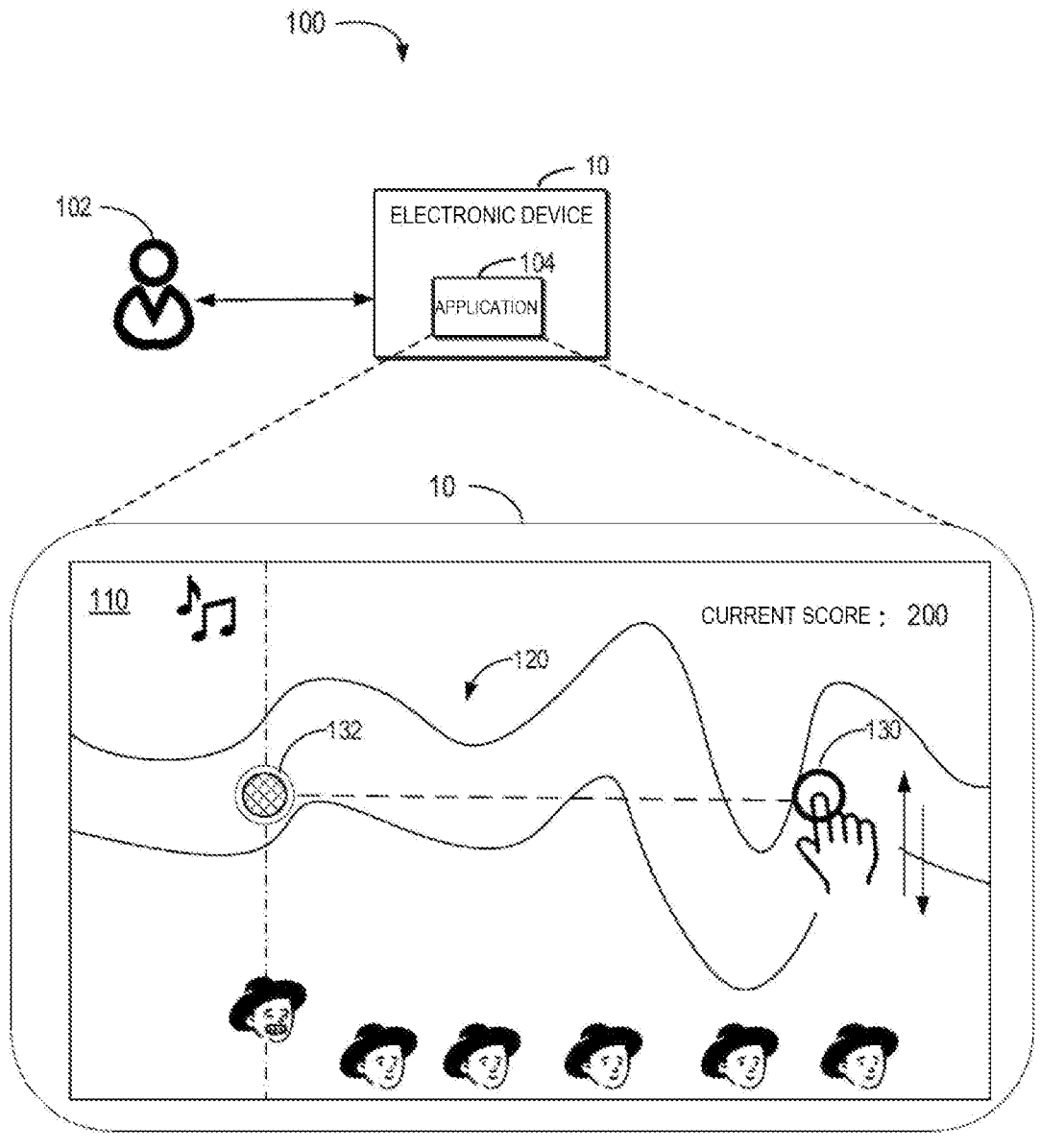
FIG. 1 shows a block diagram of an example environment in which some embodiments of the present disclosure may be implemented.

The following will describe the embodiments of the present disclosure in more detail with reference to the accompanying drawings. Although some embodiments of the present disclosure are illustrated in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

In the description of the embodiments of the present disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The terms "first", "second" and the like may refer to different objects or the same object. Other explicit and implicit definitions may also be included below.

Currently, in many fields, such as, gaming, simulation, virtual reality, etc., the interaction between users and virtual scenes mainly relies on visual presentation. For example, in a game scene, the user completes corresponding actions or tasks according to prompt information, to proceed the game process. In this scenario, audio is only used as the background music or to carry the prompt information. Such a form of interaction is relatively dull, which affects the sense of substitution in the scene.

According to various embodiments of the present disclosure, there is provided an interaction solution. For example, in the solution, a judgement area associated with an audio is presented in an interaction interface. The judgement area may be determined based on a waveform of the audio, and the presented judgement region moves with the playback of the audio. In this way, audio control can be achieved through user interaction in a virtual environment. Further, an evaluation of the user interaction can be generated based on the judgement area and an interaction position in the interaction interface.

According to the implementations of the present disclosure, the interaction forms related to audio can be supported in a virtual environment and provide interaction evaluations. Additionally, the interaction difficulty and the interaction evaluation may be adapted to the properties of the audio, e.g., fluctuation of a melody, a pitch level, a tempo speed, etc. As such, rich forms of interaction may be provided for improving the user experience and enhancing the sense of scene immersion.

In order to illustrate the principles and ideas of the embodiments of the present disclosure, certain descriptions below will refer to the field of musical interaction applications. However, it should be understood that this is merely exemplary and is not intended to limit the scope of the present disclosure in any way. The embodiments of the present disclosure can be applied in various fields, such as, simulation, emulation, virtual reality (VR), augmented reality (AR), etc.

Example Environment

Referring to FIG. 1, which shows a schematic diagram of an example environment 100 in which example implementations of the present disclosure may be implemented. As shown in FIG. 1, the example environment 100 may include an electronic device 10.

In some embodiments, the electronic device 10 may include an appropriate type of portable device. For example, the electronic device 10 may support to be held by a user's hands or worn by the user for various interactions. Such electronic device 10 may include, but is not limited to: a smartphone, tablet, handheld computer, portable gaming console, VR or AR device, and so on.

In some embodiments, the electronic device 10 may include an appropriate type of sensor for detecting user interactions. For example, the electronic device 10 may include a touchscreen for detecting various gestures made by the user on the touchscreen. The gestures may include, but are not limited to, tapping, swipe, scrolling, rotation, pinch, and the like. Additionally, or alternatively, the electronic device 10 may also include any other type of sensing device for detecting user interactions, such as, proximity sensor, accelerometer, inertial measurement system, and the like.

It should be understood that for illustrative purposes only, the electronic device 10 is shown as a portable device in FIG. 1. However, in other embodiments, the electronic device 10 may also be a device in other suitable forms. For example, the electronic device 10 may include a display device for display and a computing device for computing, and the display device and the computing device may be physically coupled or may be physically separate. Therefore, the scope of the present disclosure is not limited in this regard.

As an exemplary implementation, the electronic device 10 may include a display for presenting an interaction interface and a game console for rendering images and controlling a game. In such scenarios, the electronic device 10 may, for example, utilize other appropriate input devices to enable interaction. For example, the electronic device 10 may realize the interaction via a communicatively coupled interaction device, such as, keyboard, mouse, joystick, gamepad, and so on.

Continuing to refer to FIG. 1, the electronic device 10 may be installed with an application 104, such as, a gaming application, an AR application, a VR application, etc. In such an embodiment, the electronic device 10 may present an interaction interface 110 of the application 104 to the user 102. By way of example, the interaction interface 110 may be a virtual scene provided by the application 104.

For illustrative purposes, in the example of FIG. 1, the interaction interface 110 is shown as a musical interaction application scene. For example, the musical interaction application may involve the music performance, the band rehearsal, and the like. In such a scenario, a judgement curve 120 associated with an audio may be presented, and the judgement curve 120 may move in the interaction interface 110 with the playing of the audio. The interaction interface 110 may include an interaction control 130. The user 102 may manipulate the interaction control 130 (e.g., activate the control 130 by a swipe gesture) to control a position of a judgement point 132 in the virtual scene. Additionally, the electronic device 10 may generate an evaluation (such as, a score) for the user interaction. The user interaction and the process of interaction evaluation will be described in detail below.

It should be understood that the layout, functionality, and number of elements shown in the environment 100 are described for exemplary purposes only, and in practice, a variety of designs may exist. The embodiments of the present disclosure may also be applied to environments with different structures and/or functionalities. Therefore, the scope of the present disclosure is not limited in this regard.

The following will continue to refer to the drawings to describe the interaction process and details. In particular, the embodiments will be described below with reference to several example states of user interface (UI). It should be understood that these UIs and interactions are given merely for illustrative purpose, and in practice, various interface designs and interactions may exist. In addition, the controls included in these UIs may be implemented with any currently known or future developed UI elements and techniques. Furthermore, the types, forms, operation modes, layouts, arrangements in the UI, etc. of these controls are given for illustrative purpose and are not intended to limit the scope of the present disclosure.

Example Process

Figure 2:
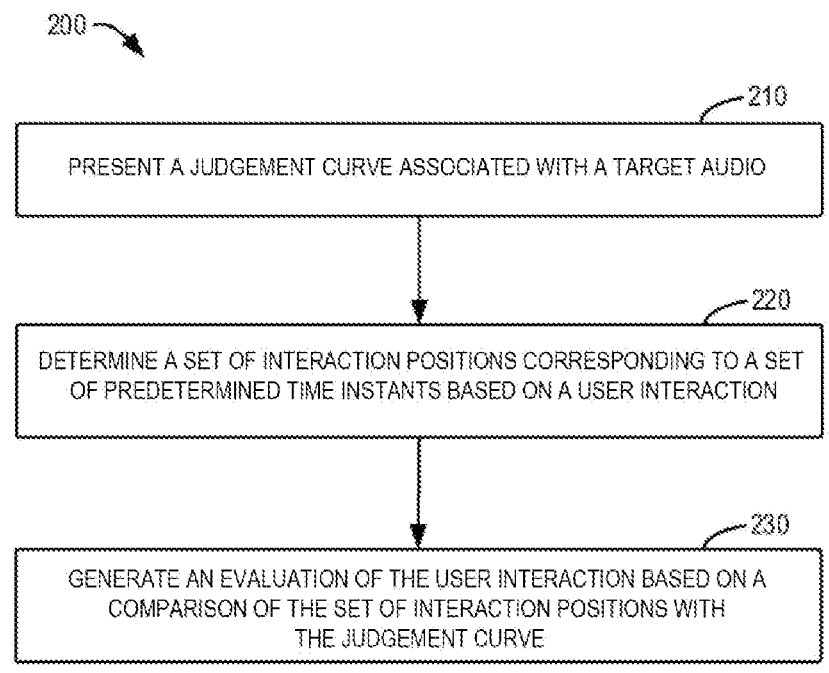
FIG. 2 shows a flowchart of an interaction process according to some embodiments of the present disclosure.

FIG. 2 shows a flowchart of an interaction process 200 according to some embodiments of the present disclosure. The process 200 may be implemented at the electronic device 10 of FIG. 1. For the purpose of discussion, the process 200 will be described in connection with FIG. 1.

For example, the process 200 may be a process in which the user 102 interacts with the musical interaction application 104 via the electronic device 10 and acquires an evaluation for the interaction. It should be understood that the musical interaction scenario is only given as one of the application scenarios of the process 200, and the embodiments of the present disclosure may be applicable to various fields, including but not limited to simulation, emulation, virtual reality, augmented reality, and the like. Therefore, the scope of the present disclosure is not limited in this regard.

At block 210, the electronic device 10 presents a judgement curve associated with a target audio in the interaction interface 110. A shape of the judgement curve is determined based on a waveform of the target audio, and the judgement curve moves with the playing of the target audio. As an example, the judgement curve may move from right to left while the audio is being played. The target audio may include, but is not limited to, a song, a piece of music, a melody, a rhythm, and the like.

Figure 3A:
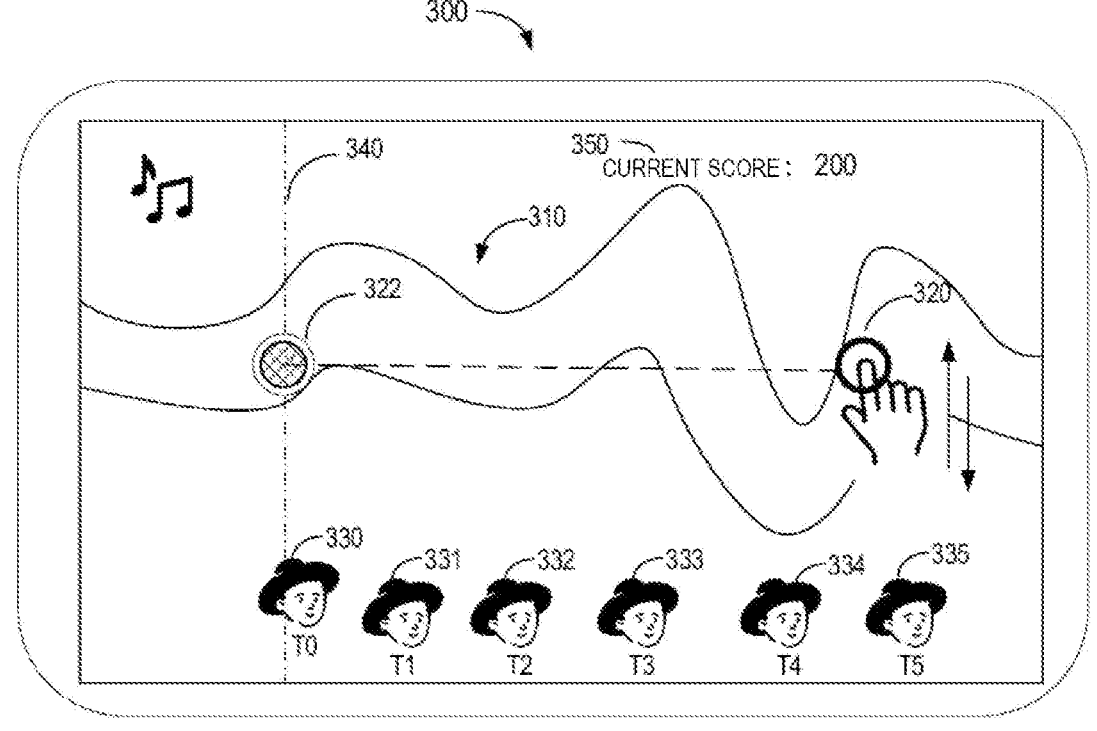
FIGS. 3A to 3D show schematic diagrams of example user interfaces according to some embodiments of the present disclosure.

The interaction interface of the electronic device 10 will be described below with reference to the example interface 300 shown in FIG. 3A. As shown in FIG. 3A, in the interaction interface 300, a judgement curve 310 is presented as the target audio is played. In some embodiments, the judgement curve 310 may be a band-like area with a width. In addition, the fluctuation degree of the judgement curve may correspond to the melodic fluctuation, pitch level, and tempo speed of the target audio. Additionally, or alternatively, the fluctuation degree and width of the judgement curve 310 may be associated with the difficulty of interaction. Therefore, in some embodiments, the fluctuation degree and width of the judgement curve 310 may be adaptively modified based on the difficulty.

The interaction interface may include the interface presented by a display screen, the AR interface, the VR interface, and the like. In some embodiments, the electronic device 10 may receive the user interaction on the interaction interface. By way of example, in embodiments where the interaction interface is presented by a display screen, the user 102 may realize the user interaction by tapping, swiping, touching, etc. on the display screen with a finger or stylus.

Additionally, or alternatively, in embodiments where the interaction interface is the AR interface or the VR interface, the user 102 may interact with the electronic device 10 by manipulating the electronic device 10 or a wearable device associated with the electronic device 10. For example, the user 102 may realize the user interaction by waving a gamepad or moving the head wearing a head-mounted display.

As shown in FIG. 3A, the electronic device 10 may detect the user interaction via an interaction control 320. For example, the user 102 may manipulate the interaction control 320 to swipe in any direction in the interaction interface 300. The interaction interface 300 also presents a judgement point 322 whose position in the interaction interface 300 changes with the user interaction. For example, in the example of FIG. 3A, the position of the judgement point 322 is horizontally aligned with the position of the control 320, and in response to a user interaction in the vertical direction (e.g., swipe up, swipe down), the judgement point 322 moves accordingly in the vertical direction.

Additionally, or alternatively, the interaction interface 300 may also present interaction points 330 to 335 that correspond to the predetermined time instants T0 to T5, respectively. In some embodiments, the interaction points 330 to 335 may be determined based on the melody fluctuation, pitch level, tempo speed, etc. of the target audio. Therefore, the interaction points 330 to 335 may correspond to the fluctuation of the judgement curve 310 in time. To enhance the interactive experience, the interaction points 330 to 335 may be presented as indication elements, e.g., avatars corresponding to virtual characters, and so on.

Additionally, or alternatively, the interaction interface 300 may further present a judgement line 340, which may be located at a predetermined position in the interaction interface 300. As one of the example implementations, the judgement point 322 may be fixed at the judgement line 340 in horizontal direction and move in the vertical direction synchronously with the user interaction.

At block 220, the electronic device 10 determines, based on the user interaction, a set of interaction positions corresponding to a set of predetermined time instants.

By way of example, in the musical interaction application scenario, the electronic device 10 may determine corresponding interaction positions at time instants T0 to T5 at which the interaction points 330 to 335 pass through the judgement line 340 with the playback of the audio. In turn, the determined interaction positions may be used for indicating the corresponding positions of the judgement point 322 at the set of predetermined time instants.

At block 230, the electronic device 10 generates an evaluation for the user interaction based on a comparison of the set of interaction positions with the judgement curve. For example, the evaluation for the user interaction may include, but is not limited to, a score, a rating, and the like. In the example of FIG. 3A, the evaluation is shown as a current score for the user interaction, and the evaluation 350 "CURRENT SCORE:200" is presented in the interaction interface 300.

In a musical interaction application scenario, for a predetermined time instant, if the judgement point 322 is determined to fall within a range of the judgement curve 310 at the predetermined time instant based on a comparison of the interaction position with the judgement curve 310, a first predefined evaluation, such as, a scoring indication, an positive indication based on a text, an audio, a special effect, and so on, may be fed back to the user 102. If the judgement point 322 is determined to fail to fall within the range of the judgement curve 310 at the predetermined time instant based on the comparison of the interaction position with the judgement curve 310, a second predefined evaluation, such as, a deduction indication, a negative indication based on the text, audio, special effect, and so on, may be fed back to the user 102.

Figure 3B:
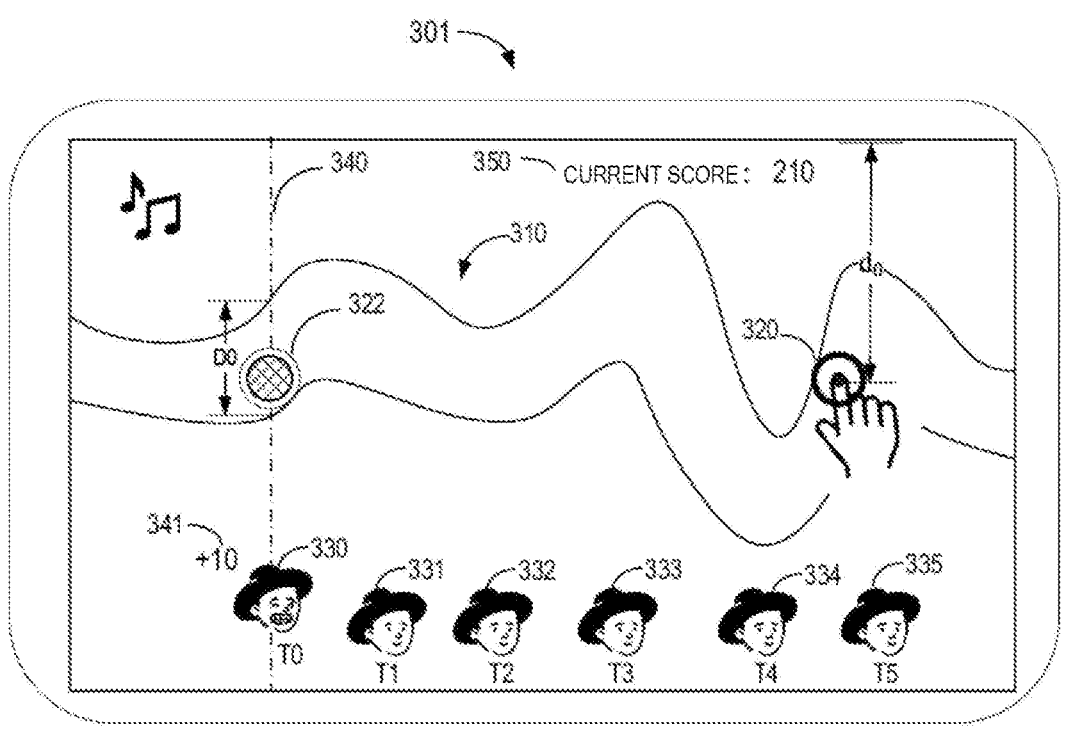

A process for generating an evaluation for a user interaction is described below with reference to the example interface 301 illustrated in FIG. 3B. In the example of FIG. 3B, a first interaction position of a set of interaction positions may correspond to an interaction position at a first time instant T0. For the first interaction position, the electronic device 10 may determine a first offset of the first interaction position relative to the interaction interface 301 at the first time instant T0. As shown in FIG. 3B, the first offset may be an offset do of the first interaction position from the top of the interface in the vertical direction. In other embodiments, the first offset may be an offset of the first interaction position relative to other reference lines or reference points on the interaction interface.

Additionally, the electronic device 10 may determining a target offset range in the judgement curve 310 corresponding to the first time instant T0. As shown in FIG. 3B, the target offset range may be a height range DO of the judgement curve 310 relative to the judgement line 340 at the first time instant T0. Next, the electronic device 10 may generate a first interaction evaluation for the first interaction position based on a comparison of the first offset with the target offset range. As an example, the electronic device 10 may compare an endpoint of do to an endpoint of DO to determine whether the first interaction position falls within the target offset range.

7

Depending on the comparison result, the first interaction evaluation may be different. For example, if the first offset falls within the target offset range, the electronic device 10 may determine the first interaction evaluation to be a first predefined evaluation. As shown in FIG. 3B, at the first time instant T0, the first offset falls within the target offset range, then the first interaction evaluation for the first interaction position is generated as the first predefined evaluation, i.e., the scoring indication 341 "+10". Additionally, or alternatively, in this case, the evaluation 350 for the user interaction may be changed, for example, the current score is increased from "200" shown in FIG. 3A to "210" shown in FIG. 3B.

Figure 3C:
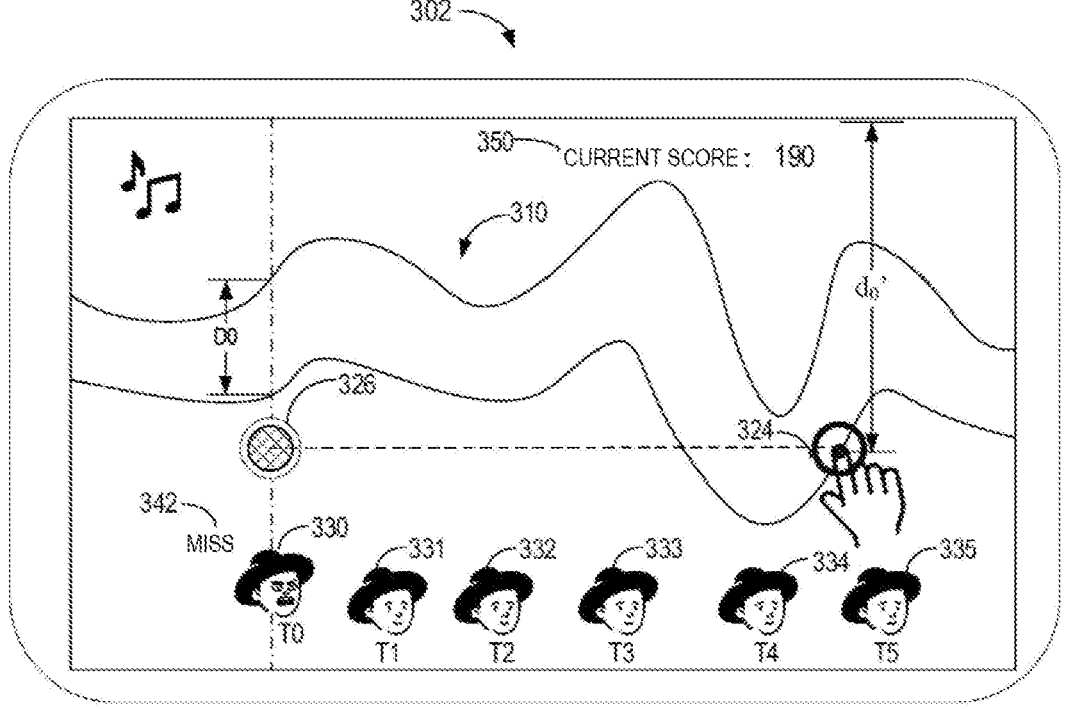

On the contrary, if the first offset fails to fall within target offset range, the electronic device 10 may determine the first interaction evaluation to be a second predefined evaluation. As shown in FIG. 3C, at the first time instant T0, the first offset of the first interaction position 324 relative to the interaction interface 302 is do', and the target offset range is DO. The first offset do' may be determined to fail to fall within the target offset range based on the endpoints of the first offset do' and the target offset range. Accordingly, the judgement point 326 falls outside the range of the judgement curve 310 at the time instant T0. In this case, the first interaction evaluation for the first interaction position 324 is generated as a second predefined evaluation, i.e., the negative indication 342 "miss". Additionally, or alternatively, in this case, the evaluation 350 for the user interaction may be changed, e.g., the current score is reduced from "200" shown in FIG. 3A to "190" shown in FIG. 3C.

In some embodiments, if offsets corresponding to a predetermined number of consecutive interaction positions of the set of interaction positions fall within corresponding offset ranges, the electronic device 10 may generate an incentive evaluation. Further, the electronic device 10 may generate an evaluation for the user interaction based on at least the incentive evaluation and the set of interaction evaluations for the set of interaction positions.

Figure 3D:
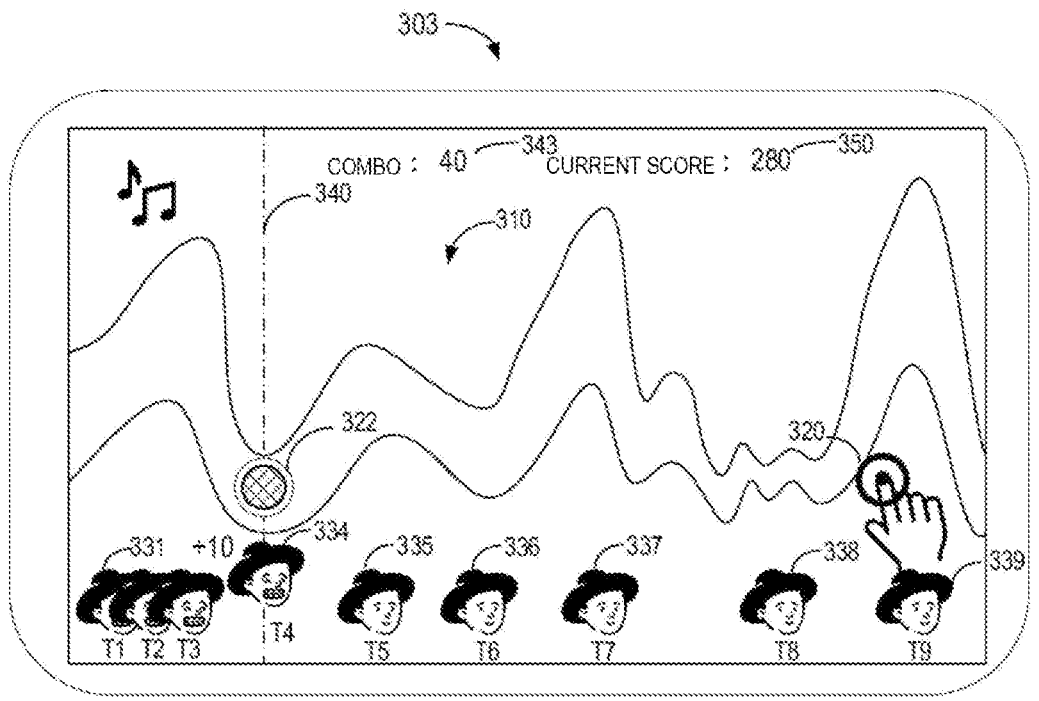

For example, the incentive evaluation may include additional scores, special effects, and the like. The predetermined number may be adaptively changed based on the interaction difficulty. In the example of FIG. 3D, the set of interaction positions includes at least interaction positions 331 to 339 corresponding to the predetermined time instants T1 to T9, and the predetermined number is 4. At the time instants T1 to T4, the judgement point 322 corresponding to the interaction position 320 falls within a target offset range of the judgement curve 310 relative to the judgement line 340. In this case, the electronic device 10 may generate the incentive evaluation 343, for example, an additional scoring indication "COMBO:40". Based on the incentive evaluation 343 and the interaction evaluations for the interaction positions 331 to 334, the evaluation 350 for the user interaction, i.e., "current score 280" may be generated.

It should be understood that as the number of consecutive interaction positions corresponding to offsets that fall within the corresponding offset ranges increases, the generated incentive evaluation may vary accordingly, e.g., additional score may grow proportionally or exponentially.

In some embodiments, an indication element for judgement at a corresponding predetermined time instant may further be presented in the interaction interface. The electronic device 10 may modify a display style of the indication element based on a comparison of the first offset with the target offset range.

As shown in FIG. 3A, at the time instant T0, the interaction point 330 reaches the judgement line 340, and the indication element of the interaction point 330 jumps from an initial position to the predetermined position. In this way, the user 102 can be prompted to perform an operation. Furthermore, the indication element of the interaction point 330 is presented as an avatar of an expressionless character. In response to the first offset falling within the target offset range at the time instant T0, as shown in FIG. 3B, the display style of the indication element of the interaction point 330 is modified from the avatar of the expressionless character to an avatar of a smiling character. Otherwise, in response to the first offset failing to fall within the target offset range at the time instant T0, as shown in FIG. 3C, the display style of the indication element of the interaction point 330 is modified from the avatar of the expressionless character to an avatar of a surprised character.

In some embodiments, the electronic device 10 may control the playback of the target audio at the first time instant based on a comparison of the first offset with the target offset range. For example, if the first offset falls within the target offset range, the electronic device 10 may play an audio signal corresponding to the first time instant in the target audio. For example, in the case where the user 102 operates correctly at the interaction point, the audio may be played normally. On the contrary, if the first offset fails to fall within the target offset range, the electronic device 10 may adjust the pitch of the audio signal for playback based on a distance between the first offset and the target offset range. For example, in the case where the user 102 operates incorrectly at the interaction point, the pitch may be adjusted to indicate that the operation is inaccurate. As an example, if the endpoint of the first offset exceeds an upper limit of the target offset range, the pitch of the audio signal may be raised. If the endpoint of the first offset is below a lower limit of the target offset range, the pitch of the audio signal may be lowered.

Additionally, or alternatively, there may be more than one user interaction. As an example, more than one user interaction may include user interactions from multiple users. For example, in a musical interaction application scenario of a band rehearsal, a first user interaction may be from a first user and correspond to drums, a second user interaction may be from a second user and correspond to the guitar, and so on.

Additionally, or alternatively, more than one user interaction may include multiple user interactions from the same user, which may correspond to different audio effects. As an example, in the musical interaction application scenario of the band rehearsal, a first user interaction may correspond to the drums, a second user interaction may correspond to applause, and so on. In addition, multiple user interactions may be triggered by different fingers or different body parts of the same user.

In some embodiments, the user interaction may be a first user interaction, and the electronic device 10 may further receive a second user interaction. The electronic device 10 may determine a set of interaction time instants corresponding to the second user interaction. Further, the electronic device 10 may generate an evaluation for the user interaction based on a first comparison of the set of interaction time instants with a set of predetermined time instants and a second comparison of the set of interaction positions with a judgement curve. Additionally, or alternatively, in some embodiments, the evaluation for the user interaction may be generated based on one of the first comparison and the second comparison.

It should be understood that the interaction time instant may be different from the predetermined time instant, or alternatively the two may overlap completely or partially.

Figure 4:
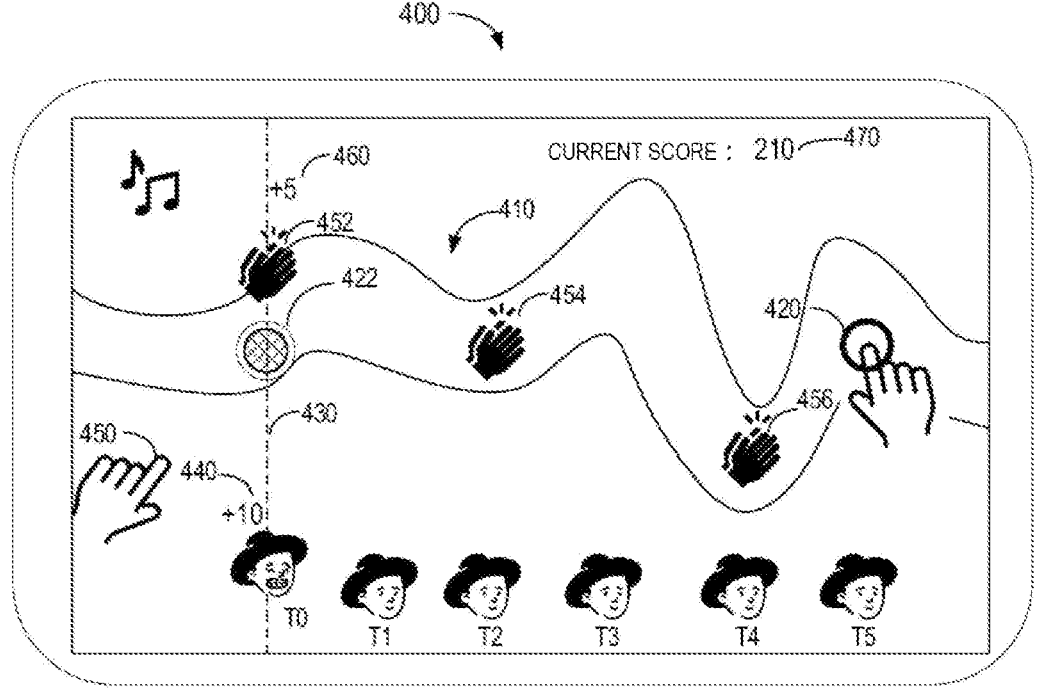
FIG. 4 shows a schematic diagram of an example user interface according to some embodiments of the present disclosure.

In the example of FIG. 4, a set of predetermined time instants includes T0 to T5, and a first user interaction 420 may correspond to an interaction operation from a right hand of the user and be used to control a judgement point 422. A second user interaction 450 may correspond to an interaction operation from a left hand of the user, and the interaction time instants corresponding to the second user interaction 450 include T0, T2, and T4, which correspond to interaction points 452, 454, and 456. As one of example implementations, the electronic device 10 may generate the evaluation based on, for example, whether the interaction time instant of the second user interaction is close to the predetermined time instant, and/or whether the interaction position of the second user interaction falls within a target offset range of the judgement curve. For example, in response to the interaction time instant of the second user interaction being close to the time instant T0, then the electronic device 10 may generate the incentive evaluation 460. In this case, the electronic device 10 may generate the evaluation 470 for the user interaction based on at least the interaction evaluation 440 and the incentive evaluation 460.

In some embodiments, the electronic device 10 may further determine difficulty information associated with the evaluation. In this case, the electronic device 10 may determine, based on the difficulty information, at least one of the following: a number of the set of predetermined time instants, a distribution of the set of predetermined time instants, a fluctuation degree of the judgement curve, and a width of the judgement curve.

In some embodiments, a user may implement the interaction process as discussed above in an Extended Reality (XR) scenario, such as, Virtual Reality (VR), Augmented Reality (AR), Mixed Reality (MR), and so on.

Figure 5:
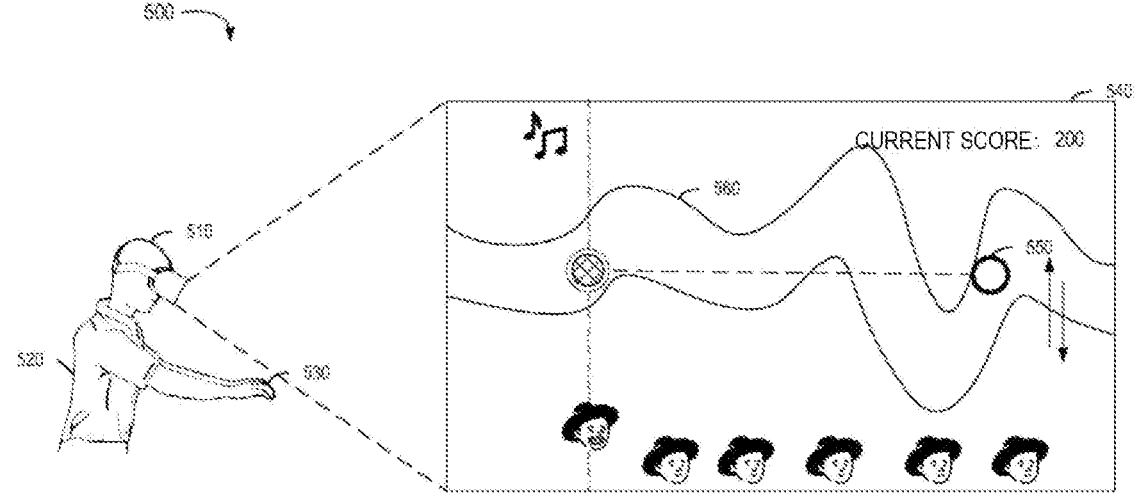
FIG. 5 shows a schematic diagram of the interaction in an extended reality scene according to some embodiments of the present disclosure.

FIG. 5 shows a schematic diagram of the interaction in the XR scenario according to some embodiments of the present disclosure. As shown in FIG. 5, a user 520 may be wearing an XR device 510. The XR device 510 may be a head-mounted or wearable near-eye display device, such as, a head-mounted display, smart glasses, etc., that supports technologies such as VR, AR, MR, etc. The XR device 510 may include an image generation component and an optical display component for providing an interaction interface 540 as shown in FIG. 5 in a monocular or binocular field of view.

Such an interaction interface 540 may, for example, be part of an immersive virtual scene. By way of example, such an interaction interface 540 may be a window in a virtual reality scene.

In some embodiments, similar to the touchscreen-based process above, the XR device 510 may detect a position change of an object 530 in the air and detect the user interaction based on the position change. Accordingly, the XR device 510 may determine the interaction position 550 corresponding to the user interaction in the interaction interface 540. Such an object 530 may include, for example, a finger of the user, or an appropriate type of manipulator held by the user's hand (e.g., a joystick, etc.). It should be understood that any appropriate technique, such as image recognition, sensor sensing, and the like, may be employed to locate the object 530, and the present disclosure is not intended to limit in this regard.

In an example that a user 520 interacts with a hand, the user 520 may, for example, make gestures of waving up and down in the air following the judgement curve 560 shown in the interaction interface 540. Such gestures may be similar to the commanding movements of a conductor, thereby providing the user with a more realistic interaction experience.

Accordingly, the interaction position 550 corresponding to the gesture of the user 520 moves up and down in the interaction interface 540, and may be compared to the judgement curve 560 in the manner as described above to obtain an interaction evaluation for the interaction of the user 520. The process regarding the comparison with the judgement curve 560 and the determination of the interaction evaluation may refer to the contents discussed above and will not be repeated herein.

In some embodiments, the XR device 510 may further provide a plurality of interaction interfaces in the virtual scene. Each of the interaction interfaces may, for example, have an arrangement similar to the interaction interface 540. In some embodiments, the plurality of interaction interfaces may correspond to different audio tracks of the target audio, e.g., audio tracks corresponding to different instruments in the target audio.

In some embodiments, the user 520 may use different objects to interact with different target interfaces, respectively. For example, the user 520 may use a left hand or a manipulator held in the left hand to interact with an interaction interface corresponding to a guitar track in the target audio, and use a right hand or another manipulator held in the right hand to interact with an interaction interface corresponding to a piano track in the target audio. In this way, the embodiments of the present disclosure can further enrich the user's interaction experience.

In some embodiments, the interaction interfaces corresponding to different audio tracks in the virtual scene may, for example, have different depths of field relative to the user 520. The user 520 may, for example, selectively switch between a plurality of interaction interfaces having different depths of field, so as to select an interaction interface with which the user currently expects to interact.

By way of example, some audio has different primary vocalizing instruments at different periods of time. Such interaction interfaces may further, for example, be automatically switched based on the distribution of audio tracks in the target audio. For example, the user 520 may, for example, need to interact with an interaction interface corresponding to a piano during a first period of time of the target audio, at which the interaction interface corresponding to a guitar may, for example, have a greater depth of field and be inactive. Further, when playing the target audio during a second period of time, which may have a guitar as the main vocalizing instrument, the interaction interface corresponding to the guitar may be automatically switched to have a smaller depth of field to receive the interaction from the user 520. Accordingly, the interaction interface corresponding to the piano, for example, may be automatically adapted to have a greater depth of field.

In some embodiments, the embodiments of the present disclosure can, for example, also support that multiple users interact in the same virtual scene. For example, another user may similarly wear the XR device that may enable the other user to join the same virtual scene as the user 520.

In a multi-user scenario, different users may, for example, have interaction privileges for different interfaces in the virtual scene. For example, one user may, for example, have the interaction privilege for an interaction interface corresponding to the piano and guitar in the target audio, while another user may, for example, have the interaction privilege for an interaction interface corresponding to the trumpet and drums in the target audio. As a result, multiple users may cooperate in the virtual scene to accomplish the interaction with the same target audio.

In some embodiments, multiple users may, for example, also collaborate to interact with the same interaction interface. Referring to FIG. 5 as an example, in addition to the user 520, another user, for example, may also join the virtual scene through a network and interact with the interface 540. In this case, an individual interaction evaluation may be generated for a single user so as to realize a scenario like a music competition. Alternatively, a final overall evaluation may be generated for the respective interactions of the multiple users.

It should be understood that for multi-user interactions, multiple users may be in the same or different physical environments, and the present disclosure is not intended to limit in this regard.

According to the process discussed above, the embodiments of the present disclosure can support audio related interaction forms in virtual environments and provide interaction evaluations. Additionally, the interaction difficulty and interaction evaluation can be adapted to the properties of the audio (e.g., the melody fluctuation, the pitch level, the tempo speed, etc.). As such, the interaction forms of the application can be enriched, and thus improving the user experience.

Example Apparatus and Device

Figure 6:
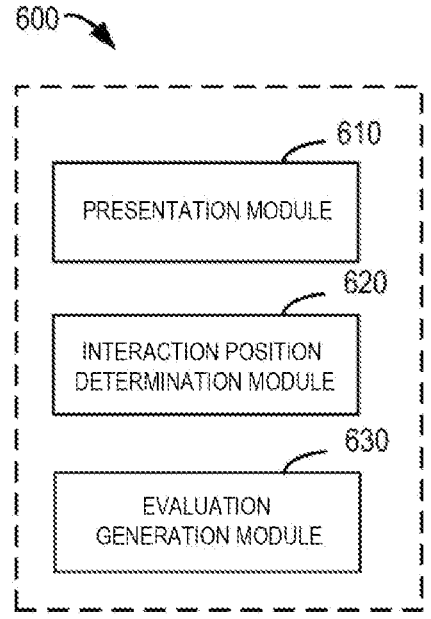
FIG. 6 shows a structural block diagram of an apparatus for interaction according to some embodiments of the present disclosure.

The embodiments of the present disclosure also provide a corresponding apparatus for implementing the above methods or processes. FIG. 6 shows a structural block diagram of an apparatus 600 for interaction according to some embodiments of the present disclosure.

As shown in FIG. 6, the apparatus 600 comprises a presentation module 610 configured to present, in an interaction interface, a judgement curve associated with a target audio, a shape of the judgement curve being determined based on a waveform of the target audio, and the judgement curve moving with a playback of the target audio. The apparatus 600 further comprises an interaction position determination module 620 configured to determine a set of interaction positions corresponding to a set of predetermined time instants based on a user interaction. In addition, the apparatus 600 comprises an evaluation generation module 630 configured to generate an evaluation for the user interaction based on a comparison of the set of interaction positions with the judgement curve.

In some embodiments, the evaluation generation module 630 is further configured to: for a first interaction position of the set of interaction positions: determine a first offset of the first interaction position relative to the interaction interface at a first time instant; determine a target offset range in the judgement curve corresponding to the first time instant; and generate a first interaction evaluation for the first interaction position based on a comparison of the first offset with the target offset range.

In some embodiments, generating the first interaction evaluation for the first interaction position comprises: in response to the first offset falling within the target offset range, determining the first interaction evaluation to be a first predefined evaluation; or in response to the first offset failing to fall within the target offset range, determining the first interaction evaluation to be a second predefined evaluation.

In some embodiments, the evaluation generation module 630 is further configured to: in response to offsets corresponding to a predetermined number of consecutive interaction positions of the set of interaction positions falling within corresponding offset ranges, generate an incentive evaluation; and generate the evaluation for the user interaction based at least on the incentive evaluation and a set of interaction evaluations for the set of interaction positions.

In some embodiments, the apparatus 600 further comprises: an indication element presentation module configured to present, in the interaction interface, an indication element for judgement at the first time instant; and modify a display style of the indication element based on the comparison of the first offset with the target offset range.

In some embodiments, the apparatus 600 further comprises: playback controlling module configured to control the playback of the target audio at the first time instant based on the comparison of the first offset with the target offset range.

In some embodiments, the playback controlling module is configured to in response to the first offset falling within the target offset range, playing an audio signal corresponding to the first time instant in the target audio; or in response to the first offset failing to fall within the target offset range, adjusting a pitch of the audio signal for playback based on a distance between the first offset and the target offset range.

In some embodiments, the user interaction is a first user interaction, and the evaluation generation module 630 is configured to: receive a second user interaction; determine a set of interaction time instants corresponding to the second user interaction; and generate the evaluation for the user interaction based on a first comparison of the set of interaction time instants with the set of predetermined time instants and a second comparison of the set of interaction positions with the judgement curve.

In some embodiments, the apparatus 600 further comprises a difficulty information determination module configured to: determine difficulty information associated with the evaluation; and determine, based on the difficulty information, at least one of the following: the number of the set of predetermined time instants, a distribution of the set of predetermined time instants, a fluctuation degree of the judgement curve, and a width of the judgement curve.

In some embodiments, the interaction interface comprises: an interface presented by a display screen, AR interface, or VR interface.

In some embodiments, the interaction interface comprises a first interaction interface in a virtual scene constructed by an Extended Reality device.

In some embodiments, the virtual scene further comprises a second interaction interface, and the first interaction interface and the second interaction interface correspond to different audio tracks of the target audio.

In some embodiments, the first interaction interface and the second interaction interface have different depths of field in the virtual scene.

In some embodiments, the first interaction interface is configured to receive a user interaction from a first user and the second interaction interface is configured to receive a user interaction from a second user different from the first user.

In some embodiments, the apparatus 600 further comprises an interaction detection module configured to: detect a change of a position of a target object, the target object comprising a hand of a user and/or a manipulator held by the user; and determine the user interaction based on the change of the position.

The units included in the apparatus 600 may be implemented in various ways, including software, hardware, firmware, or any combination thereof. In some embodiments, one or more units can be implemented using software and/or firmware, such as machine-executable instructions stored on a storage medium. In addition to or instead of machine-executable instructions, some or all of the units in apparatus 600 can be implemented at least in part by one or more hardware logic components. By way of example and not limitation, example types of hardware logic components that can be used include field programmable gate arrays (FPGAs), application specific integrated circuits (ASICs), application specific standards (ASSPs), system-on-chips (SOCs), complex programmable logic devices (CPLDs), and the like.

Figure 7:
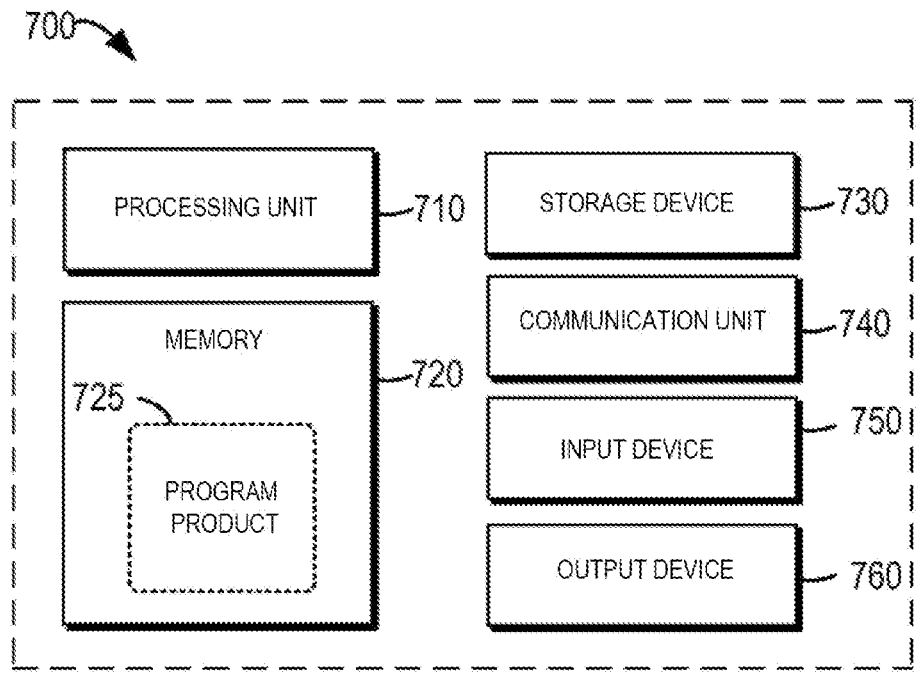
FIG. 7 shows a block diagram of an electronic device that may implement multiple embodiments of the present disclosure.

FIG. 7 illustrates a block diagram of an electronic device/server 700 in which one or more embodiments of the present disclosure may be implemented. It should be understood that the electronic device/server 700 shown in FIG. 7 is merely for illustration and should not constitute any limitation on the functionality and scope of the embodiments described herein.

As shown in FIG. 7, the electronic device/server 700 is in the form of a general purpose electronic device. components of the electronic device/server 700 may include, but are not limited to, one or more processors or processing units 710, memory 720, storage device 730, one or more communication units 740, one or more input devices 760, and one or more output devices. the processing unit 710 may be an actual or virtual processor and is capable of performing various processes based on programs stored in the memory 720. in a multiprocessor system, multiple processing units execute computer executable instructions in parallel to improve the parallel processing capability of the electronic device/server 700.

Electronic device/server 700 typically includes multiple computer storage media. Such media can be any available media accessible to electronic device/server 700, including but not limited to volatile and non-volatile media, removable and non-removable media. Memory 720 can be volatile memory (such as registers, caches, random access memory (RAM)), non-volatile memory (such as read-only memory (ROM), electrically erasable programmable read-only memory (EEPROM), flash memory), or some combination thereof. Storage device 730 can be removable or non-removable media, and can include machine-readable media such as flash drives, disks, or any other media that can be used to store information and/or data (such as training data for training) and can be accessed within electronic device/server 700.

The electronic device/server 700 may further include additional removable/non-removable, volatile/non-volatile storage media. Although not shown in FIG. 7, a disk drive for reading or writing from a removable, non-volatile disk (e.g., a "floppy disk") and an optical disk drive for reading or writing from a removable, non-volatile optical disk may be provided. In these cases, each drive may be connected to a bus (not shown) by one or more data media interfaces. The memory 720 may include a computer program product 725 having one or more program modules configured to perform various methods or acts of various embodiments of the present disclosure.

The communication unit 740 implements communication with other electronic devices through a communication medium. additionally, the functions of the components of the electronic device/server 700 may be implemented in a single computing cluster or multiple computing machines capable of communicating through communication connections. thus, the electronic device/server 700 may operate in a networked environment using logical connections with one or more other servers, a network personal computer (PC), or another network node.

The input device 750 may be one or more input devices, such as a mouse, keyboard, trackball, etc. The output device

760 may be one or more output devices, such as, a display, speaker, printer, etc. The electronic device/server 700 may also communicate, as desired, via the communication unit 740, with one or more external devices (not shown), such as storage devices, display devices, etc., with one or more devices that enable a user to interact with the electronic device/server 700, or with any device (e.g., network interface card, modem, etc.) that enables the electronic device/server 700 to communicate with one or more other electronic devices. Such communication may be performed via an input/output (I/O) interface (not shown).

According to example implementations of the present disclosure, a computer-readable storage medium is provided having one or more computer instructions stored thereon, wherein the one or more computer instructions are executed by a processor to implement the methods described above.

Various aspects of the present disclosure are described herein with reference to flowcharts and/or block diagrams of methods, apparatus (systems), and computer program products implemented in accordance with the present disclosure. It should be understood that each block of the flowcharts and/or block diagrams and combinations of the blocks in the flowcharts and/or block diagrams can be implemented by computer-readable program instructions.

These computer-readable program instructions may be provided to a processing unit of a general purpose computer, special purpose computer, or other programmable data processing device to produce a machine that, when executed by a processing unit of a computer or other programmable data processing device, produces a device that implements the functions/actions specified in one or more blocks in the flowchart and/or block diagrams. These computer-readable program instructions may also be stored in a computer-readable storage medium, which causes the computer, programmable data processing device, and/or other device to operate in a specific manner. Thus, the computer-readable medium storing the instructions includes an article of manufacture that includes instructions for implementing various aspects of the functions/actions specified in one or more blocks in the flowchart and/or block diagrams.

Computer-readable program instructions can also be loaded onto a computer, other programmable data processing device, or other device to perform a series of operational steps on the computer, other programmable data processing device, or other device to produce a computer-implemented process, so that the instructions executed on the computer, other programmable data processing device, or other device implement the functions/actions specified in one or more blocks in the flowchart and/or block diagram.

The flowcharts and block diagrams in the accompanying drawings show the architecture, functions, and operations of possible implementations of systems, methods, and computer program products according to the present disclosure. In this regard, each block in the flowcharts or block diagrams may represent a module, program segment, or part of an instruction that contains one or more executable instructions for implementing a specified logical function. In some alternative implementations, the functions marked in the blocks may also occur in a different order than those marked in the drawings. For example, two consecutive blocks can actually be executed in parallel, and they can sometimes be executed in the opposite order, depending on the functions involved. It should also be noted that each block in the diagrams and/or flowcharts, as well as combinations of blocks in the diagrams and/or flowcharts, can be implemented using a dedicated hardware-based system that performs the specified functions or actions, or can be implemented using a combination of dedicated hardware and computer instructions.

Various implementations of the present disclosure have been described above. The foregoing description is exemplary and not exhaustive, and is not limited to the implementations as disclosed. Without departing from the scope and spirit of the illustrated implementations, many modifications and changes will be apparent to one of ordinary skill in the art. The terminology used herein has been chosen to best explain the principles of the implementations, the practical applications, or improvements to the technology in the industry, or to enable others of ordinary skill in the art to understand the implementations disclosed herein.

The invention claimed is:

1. A method for interaction comprising:
presenting, in an interaction interface, a judgement curve associated with a target audio, a shape of the judgement curve being determined based on a waveform of the target audio, and the judgement curve moving with a playback of the target audio, the judgement curve being a band-like area with a width, the width being associated with a property of the target audio;
determining a set of interaction positions corresponding to a set of predetermined time instants based on a user interaction; and
generating an evaluation for the user interaction based on a comparison of the set of interaction positions with the band-like area corresponding to the judgement curve.

2. The method of claim 1, wherein generating the evaluation for the user interaction comprises:
for a first interaction position of the set of interaction positions:
determining a first offset of the first interaction position relative to the interaction interface at a first time instant;
determining a target offset range in the judgement curve corresponding to the first time instant; and
generating a first interaction evaluation for the first interaction position based on a comparison of the first offset with the target offset range.

3. The method of claim 2, wherein generating the first interaction evaluation for the first interaction position comprises:
in response to the first offset falling within the target offset range, determining the first interaction evaluation to be a first predefined evaluation; or
in response to the first offset failing to fall within the target offset range, determining the first interaction evaluation to be a second predefined evaluation.

4. The method of claim 2, wherein generating the evaluation for the user interaction comprises:
in response to offsets corresponding to a predetermined number of consecutive interaction positions of the set of interaction positions falling within corresponding offset ranges, generating an incentive evaluation; and
generating the evaluation for the user interaction based at least on the incentive evaluation and a set of interaction evaluations for the set of interaction positions.

5. The method of claim 2, further comprising:
presenting, in the interaction interface, an indication element for judgement at the first time instant; and
modifying a display style of the indication element based on the comparison of the first offset with the target offset range.

6. The method of claim 2, further comprising:
controlling the playback of the target audio at the first time instant based on the comparison of the first offset with the target offset range.

7. The method of claim 6, wherein controlling the playback of the target audio at the first time instant comprises:
in response to the first offset falling within the target offset range, playing an audio signal corresponding to the first time instant in the target audio; or
in response to the first offset failing to fall within the target offset range, adjusting a pitch of the audio signal for playback based on a distance between the first offset and the target offset range.

8. The method of claim 1, wherein the user interaction is a first user interaction, and generating the evaluation for the user interaction comprises:
receiving a second user interaction;
determining a set of interaction time instants corresponding to the second user interaction; and
generating the evaluation for the user interaction based on a first comparison of the set of interaction time instants with the set of predetermined time instants and a second comparison of the set of interaction positions with the judgement curve.

9. The method of claim 1, further comprising:
determining difficulty information associated with the evaluation; and
determining, based on the difficulty information, at least one of the following: a number of the set of predetermined time instants, a distribution of the set of predetermined time instants, a fluctuation degree of the judgement curve, and a width of the judgement curve.

10. The method of claim 1, wherein the interaction interface comprises:
an interface presented by a display screen,
an augmented reality, AR, interface, or
a virtual reality, VR, interface.

11. The method of claim 1, wherein the interaction interface comprises a first interaction interface in a virtual scene constructed by an Extended Reality device.

12. The method of claim 11, wherein the virtual scene further comprises a second interaction interface, and the first interaction interface and the second interaction interface correspond to different audio tracks of the target audio.

13. The method of claim 12, wherein the first interaction interface and the second interaction interface have different depths of field in the virtual scene.

14. The method of claim 12, wherein the first interaction interface is configured to receive a user interaction from a first user and the second interaction interface is configured to receive a user interaction from a second user different from the first user.

15. The method of claim 11, further comprising:
detecting a change of a position of a target object, the target object comprising a hand of a user and/or a manipulator held by the user; and
determining the user interaction based on the change of the position.

16. An electronic device comprising:
at least one processing unit; and
at least one memory coupled to the at least one processing unit and storing instructions for execution by the at least one processing unit, wherein the instructions, when executed by the at least one processing unit, cause the electronic device to carry out a method comprising:

presenting, in an interaction interface, a judgement curve associated with a target audio, a shape of the judgement curve being determined based on a waveform of the target audio, and the judgement curve moving with a playback of the target audio, the judgement curve being a band-like area with a width, the width being associated with a property of the target audio;

determining a set of interaction positions corresponding to a set of predetermined time instants based on a user interaction; and generating an evaluation for the user interaction based on a comparison of the set of interaction positions with the band-like area corresponding to the judgement curve.

17. The electronic device of claim 16, wherein generating the evaluation for the user interaction comprises:

for a first interaction position of the set of interaction positions:

determining a first offset of the first interaction position relative to the interaction interface at a first time instant;

determining a target offset range in the judgement curve corresponding to the first time instant; and generating a first interaction evaluation for the first interaction position based on a comparison of the first offset with the target offset range.

18. The electronic device of claim 17, wherein generating the first interaction evaluation for the first interaction position comprises:

in response to the first offset falling within the target offset range, determining the first interaction evaluation to be a first predefined evaluation; or in response to the first offset failing to fall within the target offset range, determining the first interaction evaluation to be a second predefined evaluation.

19. The electronic device of claim 17, wherein generating the evaluation for the user interaction comprises:

in response to offsets corresponding to a predetermined number of consecutive interaction positions of the set of interaction positions falling within corresponding offset ranges, generating an incentive evaluation; and generating the evaluation for the user interaction based at least on the incentive evaluation and a set of interaction evaluations for the set of interaction positions.

20. A computer readable storage medium having a computer program stored thereon, wherein the computer program is executed by a processor to carry out a method comprising:

presenting, in an interaction interface, a judgement curve associated with a target audio, a shape of the judgement curve being determined based on a waveform of the target audio, and the judgement curve moving with a playback of the target audio, the judgement curve being a band-like area with a width, the width being associated with a property of the target audio;

determining a set of interaction positions corresponding to a set of predetermined time instants based on a user interaction; and generating an evaluation for the user interaction based on a comparison of the set of interaction positions with the band-like area corresponding to the judgement curve.

\* \* \* \* \*